United States Patent
Levi et al.

(10) Patent No.: US 12,177,325 B2
(45) Date of Patent: *Dec. 24, 2024

(54) CLOCK QUEUE WITH ARMING AND/OR SELF-ARMING FEATURES

(71) Applicant: MELLANOX TECHNOLOGIES, LTD., Yokneam (IL)

(72) Inventors: Dotan David Levi, Kiryat Motzkin (IL); Ariel Shahar, Jerusalem (IL); Shahaf Shuler, Kibbutz Lohamei Hagetaot (IL); Ariel Almog, Kohav Yair (IL); Eitan Hirshberg, Pardes Hana Karkur (IL); Natan Manevich, Ramat Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,991

(22) Filed: Nov. 30, 2023

(65) Prior Publication Data
US 2024/0097876 A1    Mar. 21, 2024

Related U.S. Application Data

(63) Continuation of application No. 17/335,122, filed on Jun. 1, 2021, now Pat. No. 11,876,885.

(60) Provisional application No. 63/047,275, filed on Jul. 2, 2020.

(51) Int. Cl.
*H04L 7/00* (2006.01)

(52) U.S. Cl.
CPC .................. *H04L 7/0091* (2013.01)

(58) Field of Classification Search
CPC ....................................... H04L 7/0091
See application file for complete search history.

(56) References Cited

U.S. PATENT DOCUMENTS

| | | | |
|---|---|---|---|
| 4,933,969 A | 6/1990 | Marshall et al. | |
| 5,068,877 A | 11/1991 | Near et al. | |
| 5,325,500 A | 6/1994 | Bell et al. | |
| 5,353,412 A | 10/1994 | Douglas et al. | |
| 5,404,565 A | 4/1995 | Gould et al. | |
| 5,408,469 A | 4/1995 | Opher et al. | |

(Continued)

FOREIGN PATENT DOCUMENTS

| | | |
|---|---|---|
| AU | 2012216611 B2 | 3/2013 |
| CN | 103095607 A | 5/2013 |

(Continued)

OTHER PUBLICATIONS

CN Application # 202110742521.4 Office Action dated Jan. 30, 2024.

(Continued)

*Primary Examiner* — Brenda H Pham
(74) *Attorney, Agent, or Firm* — MEITAR PATENTS LTD.

(57) ABSTRACT

A communication system includes at least one send queue, containing send queue entries pointing to packets to be transmitted over a network by packet sending circuitry. A clock work queue contains clock queue entries to synchronize sending times of the packets pointed to by the send queue entries. At least one arming queue contains arming queue entries to arm the clock work queue at selected time intervals.

20 Claims, 9 Drawing Sheets

(56) References Cited

U.S. PATENT DOCUMENTS

| | | |
|---|---|---|
| 5,606,703 A | 2/1997 | Brady et al. |
| 5,944,779 A | 8/1999 | Blum |
| 6,041,049 A | 3/2000 | Brady |
| 6,115,394 A | 9/2000 | Balachandran et al. |
| 6,212,197 B1 | 4/2001 | Christensen et al. |
| 6,370,502 B1 | 4/2002 | Wu et al. |
| 6,438,137 B1 | 8/2002 | Turner et al. |
| 6,483,804 B1 | 11/2002 | Muller et al. |
| 6,507,562 B1 | 1/2003 | Kadansky et al. |
| 6,728,862 B1 | 4/2004 | Wilson |
| 6,816,492 B1 | 11/2004 | Turner et al. |
| 6,857,004 B1 | 2/2005 | Howard et al. |
| 6,937,576 B1 | 8/2005 | Di Benedetto et al. |
| 7,102,998 B1 | 9/2006 | Golestani |
| 7,124,180 B1 | 10/2006 | Ranous |
| 7,164,422 B1 | 1/2007 | Wholey, III et al. |
| 7,171,484 B1 | 1/2007 | Krause et al. |
| 7,224,669 B2 | 5/2007 | Kagan et al. |
| 7,245,627 B2 | 7/2007 | Goldenberg et al. |
| 7,313,582 B2 | 12/2007 | Bhanot et al. |
| 7,327,693 B1 | 2/2008 | Rivers et al. |
| 7,336,646 B2 | 2/2008 | Muller |
| 7,346,698 B2 | 3/2008 | Hannaway |
| 7,555,549 B1 | 6/2009 | Campbell et al. |
| 7,613,774 B1 | 11/2009 | Caronni et al. |
| 7,636,424 B1 | 12/2009 | Halikhedkar et al. |
| 7,636,699 B2 | 12/2009 | Stanfill |
| 7,676,597 B2 | 3/2010 | Kagan et al. |
| 7,738,443 B2 | 6/2010 | Kumar |
| 7,760,743 B2 | 7/2010 | Shokri et al. |
| 8,213,315 B2 | 7/2012 | Crupnicoff et al. |
| 8,255,475 B2 | 8/2012 | Kagan et al. |
| 8,370,675 B2 | 2/2013 | Kagan |
| 8,380,880 B2 | 2/2013 | Gulley et al. |
| 8,510,366 B1 | 8/2013 | Anderson et al. |
| 8,645,663 B2 | 2/2014 | Kagan et al. |
| 8,738,891 B1 | 5/2014 | Karandikar et al. |
| 8,761,189 B2 | 6/2014 | Shachar et al. |
| 8,768,898 B1 | 7/2014 | Trimmer et al. |
| 8,775,698 B2 | 7/2014 | Archer et al. |
| 8,811,417 B2 | 8/2014 | Bloch et al. |
| 9,110,860 B2 | 8/2015 | Shahar |
| 9,189,447 B2 | 11/2015 | Faraj |
| 9,294,551 B1 | 3/2016 | Froese et al. |
| 9,344,490 B2 | 5/2016 | Bloch et al. |
| 9,397,960 B2 | 7/2016 | Arad et al. |
| 9,456,060 B2 | 9/2016 | Pope et al. |
| 9,563,426 B1 | 2/2017 | Bent et al. |
| 9,626,329 B2 | 4/2017 | Howard |
| 9,756,154 B1 | 9/2017 | Jiang |
| 10,015,106 B1 | 7/2018 | Florissi et al. |
| 10,027,601 B2 | 7/2018 | Narkis et al. |
| 10,158,702 B2 | 12/2018 | Bloch et al. |
| 10,187,400 B1 | 1/2019 | Castro et al. |
| 10,284,383 B2 | 5/2019 | Bloch et al. |
| 10,296,351 B1 | 5/2019 | Kohn et al. |
| 10,305,980 B1 | 5/2019 | Gonzalez et al. |
| 10,318,306 B1 | 6/2019 | Kohn et al. |
| 10,320,508 B2 | 6/2019 | Shimizu et al. |
| 10,425,350 B1 | 9/2019 | Florissi |
| 10,515,045 B1 | 12/2019 | Mattina |
| 10,521,283 B2 | 12/2019 | Shuler et al. |
| 10,528,518 B2 | 1/2020 | Graham et al. |
| 10,541,938 B1 | 1/2020 | Timmerman et al. |
| 10,547,553 B2 | 1/2020 | Shattah et al. |
| 10,621,489 B2 | 4/2020 | Appuswamy et al. |
| 10,727,966 B1 | 7/2020 | Izenberg et al. |
| 11,088,971 B2 | 8/2021 | Brody et al. |
| 11,336,383 B2 | 5/2022 | Mula et al. |
| 11,388,263 B2 | 7/2022 | Levi et al. |
| 11,876,885 B2* | 1/2024 | Levi .................. H04L 7/0091 |
| 2002/0010844 A1 | 1/2002 | Noel et al. |
| 2002/0035625 A1 | 3/2002 | Tanaka |
| 2002/0150094 A1 | 10/2002 | Cheng et al. |
| 2002/0150106 A1 | 10/2002 | Kagan et al. |
| 2002/0152315 A1 | 10/2002 | Kagan et al. |
| 2002/0152327 A1 | 10/2002 | Kagan et al. |
| 2002/0152328 A1 | 10/2002 | Kagan et al. |
| 2002/0165897 A1 | 11/2002 | Kagan et al. |
| 2003/0002483 A1 | 1/2003 | Zwack |
| 2003/0018828 A1 | 1/2003 | Craddock et al. |
| 2003/0061417 A1 | 3/2003 | Craddock et al. |
| 2003/0065856 A1 | 4/2003 | Kagan et al. |
| 2003/0120835 A1 | 6/2003 | Kale et al. |
| 2004/0030745 A1 | 2/2004 | Boucher et al. |
| 2004/0062258 A1 | 4/2004 | Grow et al. |
| 2004/0078493 A1 | 4/2004 | Blumrich et al. |
| 2004/0120331 A1 | 6/2004 | Rhine et al. |
| 2004/0123071 A1 | 6/2004 | Stefan et al. |
| 2004/0174820 A1 | 9/2004 | Ricciulli |
| 2004/0252685 A1 | 12/2004 | Kagan et al. |
| 2004/0260683 A1 | 12/2004 | Chan et al. |
| 2005/0097300 A1 | 5/2005 | Gildea et al. |
| 2005/0122329 A1 | 6/2005 | Janus |
| 2005/0129039 A1 | 6/2005 | Biran et al. |
| 2005/0131865 A1 | 6/2005 | Jones et al. |
| 2005/0223118 A1 | 10/2005 | Tucker et al. |
| 2005/0281287 A1 | 12/2005 | Ninomi et al. |
| 2006/0095610 A1 | 5/2006 | Arndt et al. |
| 2006/0282838 A1 | 12/2006 | Gupta et al. |
| 2007/0127396 A1 | 6/2007 | Jain et al. |
| 2007/0127525 A1 | 6/2007 | Sarangam et al. |
| 2007/0162236 A1 | 7/2007 | Lamblin et al. |
| 2008/0040792 A1 | 2/2008 | Larson et al. |
| 2008/0104218 A1 | 5/2008 | Liang et al. |
| 2008/0126564 A1 | 5/2008 | Wilkinson |
| 2008/0168471 A1 | 7/2008 | Benner et al. |
| 2008/0181260 A1 | 7/2008 | Vonog et al. |
| 2008/0192750 A1 | 8/2008 | Ko et al. |
| 2008/0219159 A1 | 9/2008 | Chateau et al. |
| 2008/0244220 A1 | 10/2008 | Lin et al. |
| 2008/0263329 A1 | 10/2008 | Archer et al. |
| 2008/0288949 A1 | 11/2008 | Bohra et al. |
| 2008/0298380 A1 | 12/2008 | Rittmeyer et al. |
| 2008/0307082 A1 | 12/2008 | Cai et al. |
| 2009/0037377 A1 | 2/2009 | Archer et al. |
| 2009/0063816 A1 | 3/2009 | Arimilli et al. |
| 2009/0063817 A1 | 3/2009 | Arimilli et al. |
| 2009/0063891 A1 | 3/2009 | Arimilli et al. |
| 2009/0182814 A1 | 7/2009 | Tapolcai et al. |
| 2009/0240838 A1 | 9/2009 | Berg et al. |
| 2009/0247241 A1 | 10/2009 | Gollnick et al. |
| 2009/0292905 A1 | 11/2009 | Faraj |
| 2009/0296699 A1 | 12/2009 | Hefty |
| 2009/0327444 A1 | 12/2009 | Archer et al. |
| 2010/0017420 A1 | 1/2010 | Archer et al. |
| 2010/0049836 A1 | 2/2010 | Kramer |
| 2010/0074098 A1 | 3/2010 | Zeng et al. |
| 2010/0095086 A1 | 4/2010 | Eichenberger et al. |
| 2010/0185719 A1 | 7/2010 | Howard |
| 2010/0241828 A1 | 9/2010 | Yu et al. |
| 2010/0274876 A1 | 10/2010 | Kagan et al. |
| 2010/0329275 A1 | 12/2010 | Johnsen et al. |
| 2011/0060891 A1 | 3/2011 | Jia |
| 2011/0066649 A1 | 3/2011 | Berlyant et al. |
| 2011/0093258 A1 | 4/2011 | Xu et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0254110 A1 | 10/2012 | Takemoto |
| 2013/0117548 A1 | 5/2013 | Grover et al. |
| 2013/0159410 A1 | 6/2013 | Lee et al. |
| 2013/0159568 A1 | 6/2013 | Shahar et al. |
| 2013/0215904 A1 | 8/2013 | Zhou et al. |
| 2013/0250756 A1 | 9/2013 | Johri et al. |
| 2013/0312011 A1 | 11/2013 | Kumar et al. |
| 2013/0318525 A1 | 11/2013 | Palanisamy et al. |
| 2013/0336292 A1 | 12/2013 | Kore et al. |

(56) References Cited

U.S. PATENT DOCUMENTS

| | | |
|---|---|---|
| 2014/0019574 A1 | 1/2014 | Cardona et al. |
| 2014/0033217 A1 | 1/2014 | Vajda et al. |
| 2014/0040542 A1 | 2/2014 | Kim et al. |
| 2014/0047341 A1 | 2/2014 | Breternitz et al. |
| 2014/0095779 A1 | 4/2014 | Forsyth et al. |
| 2014/0122831 A1 | 5/2014 | Uliel et al. |
| 2014/0136811 A1 | 5/2014 | Fleischer et al. |
| 2014/0189308 A1 | 7/2014 | Hughes et al. |
| 2014/0211804 A1 | 7/2014 | Makikeni et al. |
| 2014/0258438 A1 | 9/2014 | Ayoub |
| 2014/0280420 A1 | 9/2014 | Khan |
| 2014/0281370 A1 | 9/2014 | Khan |
| 2014/0362692 A1 | 12/2014 | Wu et al. |
| 2014/0365548 A1 | 12/2014 | Mortensen |
| 2014/0379714 A1 | 12/2014 | Hankins |
| 2015/0046741 A1 | 2/2015 | Yen et al. |
| 2015/0055508 A1 | 2/2015 | Ashida et al. |
| 2015/0074373 A1 | 3/2015 | Sperber et al. |
| 2015/0106578 A1 | 4/2015 | Warfield et al. |
| 2015/0143076 A1 | 5/2015 | Khan |
| 2015/0143077 A1 | 5/2015 | Khan |
| 2015/0143078 A1 | 5/2015 | Khan et al. |
| 2015/0143079 A1 | 5/2015 | Khan |
| 2015/0143085 A1 | 5/2015 | Khan |
| 2015/0143086 A1 | 5/2015 | Khan |
| 2015/0154058 A1 | 6/2015 | Miwa et al. |
| 2015/0178211 A1 | 6/2015 | Hiramoto et al. |
| 2015/0180785 A1 | 6/2015 | Annamraju |
| 2015/0188987 A1 | 7/2015 | Reed et al. |
| 2015/0193271 A1 | 7/2015 | Archer et al. |
| 2015/0212972 A1 | 7/2015 | Boettcher et al. |
| 2015/0261720 A1 | 9/2015 | Kagan et al. |
| 2015/0269116 A1 | 9/2015 | Raikin et al. |
| 2015/0278347 A1 | 10/2015 | Meyer et al. |
| 2015/0318015 A1 | 11/2015 | Bose et al. |
| 2015/0347012 A1 | 12/2015 | Dewitt et al. |
| 2015/0365494 A1 | 12/2015 | Cardona et al. |
| 2015/0379022 A1 | 12/2015 | Puig et al. |
| 2016/0055225 A1 | 2/2016 | Xu et al. |
| 2016/0092362 A1 | 3/2016 | Barron et al. |
| 2016/0105494 A1 | 4/2016 | Reed et al. |
| 2016/0112531 A1 | 4/2016 | Milton et al. |
| 2016/0117277 A1 | 4/2016 | Raindel et al. |
| 2016/0119244 A1 | 4/2016 | Wang et al. |
| 2016/0179537 A1 | 6/2016 | Kunzman et al. |
| 2016/0219009 A1 | 7/2016 | French |
| 2016/0246646 A1 | 8/2016 | Craciunas et al. |
| 2016/0248656 A1 | 8/2016 | Anand et al. |
| 2016/0283422 A1 | 9/2016 | Crupnicoff et al. |
| 2016/0294793 A1 | 10/2016 | Larson et al. |
| 2016/0299872 A1 | 10/2016 | Vaidyanathan et al. |
| 2016/0342568 A1 | 11/2016 | Burchard et al. |
| 2016/0352598 A1 | 12/2016 | Reinhardt et al. |
| 2016/0364350 A1 | 12/2016 | Sanghi et al. |
| 2017/0063613 A1 | 3/2017 | Bloch et al. |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0192782 A1 | 7/2017 | Valentine et al. |
| 2017/0199844 A1 | 7/2017 | Burchard et al. |
| 2017/0262517 A1 | 9/2017 | Horowitz et al. |
| 2017/0308329 A1 | 10/2017 | A et al. |
| 2017/0331926 A1 | 11/2017 | Raveh et al. |
| 2017/0344589 A1 | 11/2017 | Kafai et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1 | 4/2018 | Matsui et al. |
| 2018/0115529 A1 | 4/2018 | Munger et al. |
| 2018/0173673 A1 | 6/2018 | Daglis et al. |
| 2018/0262551 A1 | 9/2018 | Demeyer et al. |
| 2018/0278549 A1 | 9/2018 | Mula et al. |
| 2018/0285151 A1 | 10/2018 | Wang et al. |
| 2018/0285316 A1 | 10/2018 | Thorson et al. |
| 2018/0287725 A1 | 10/2018 | Rabinovich et al. |
| 2018/0287928 A1 | 10/2018 | Levi et al. |
| 2018/0302324 A1 | 10/2018 | Kasuya |
| 2018/0321912 A1 | 11/2018 | Li et al. |
| 2018/0321938 A1 | 11/2018 | Boswell et al. |
| 2018/0349212 A1 | 12/2018 | Liu et al. |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0044827 A1 | 2/2019 | Ganapathi et al. |
| 2019/0044875 A1 | 2/2019 | Murty et al. |
| 2019/0044889 A1 | 2/2019 | Serres et al. |
| 2019/0056972 A1 | 2/2019 | Zhou et al. |
| 2019/0065208 A1 | 2/2019 | Liu et al. |
| 2019/0068501 A1 | 2/2019 | Schneder et al. |
| 2019/0102090 A1 | 4/2019 | Guim et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0114533 A1 | 4/2019 | Ng et al. |
| 2019/0121388 A1 | 4/2019 | Knowles et al. |
| 2019/0124524 A1 | 4/2019 | Gormley |
| 2019/0138638 A1 | 5/2019 | Pal et al. |
| 2019/0141133 A1 | 5/2019 | Rajan et al. |
| 2019/0147092 A1 | 5/2019 | Pal et al. |
| 2019/0149486 A1 | 5/2019 | Bohrer et al. |
| 2019/0149488 A1 | 5/2019 | Bansal et al. |
| 2019/0171612 A1 | 6/2019 | Shahar et al. |
| 2019/0187774 A1 | 6/2019 | Yi et al. |
| 2019/0235866 A1 | 8/2019 | Das Sarma et al. |
| 2019/0278737 A1 | 9/2019 | Kozomora et al. |
| 2019/0303168 A1 | 10/2019 | Fleming, Jr. et al. |
| 2019/0303263 A1 | 10/2019 | Fleming, Jr. et al. |
| 2019/0319730 A1 | 10/2019 | Webb et al. |
| 2019/0324431 A1 | 10/2019 | Cella et al. |
| 2019/0339688 A1 | 11/2019 | Cella et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak |
| 2020/0103894 A1 | 4/2020 | Cella et al. |
| 2020/0106828 A1 | 4/2020 | Elias et al. |
| 2020/0137013 A1 | 4/2020 | Jin et al. |
| 2020/0202246 A1 | 6/2020 | Lin et al. |
| 2020/0265043 A1 | 8/2020 | Graham et al. |
| 2020/0274733 A1 | 8/2020 | Graham et al. |
| 2021/0203621 A1 | 7/2021 | Ylisirnio et al. |
| 2021/0218808 A1 | 7/2021 | Graham et al. |
| 2021/0234753 A1 | 7/2021 | Ben-Moshe et al. |
| 2021/0243140 A1 | 8/2021 | Levi et al. |
| 2021/0297151 A1 | 9/2021 | Levi et al. |
| 2022/0006606 A1 | 1/2022 | Levi et al. |
| 2022/0029854 A1 | 1/2022 | Graham et al. |
| 2022/0078043 A1 | 3/2022 | Marcovitch et al. |
| 2022/0188147 A1 | 6/2022 | Nudelman et al. |
| 2022/0201103 A1 | 6/2022 | Keppel et al. |
| 2023/0089099 A1 | 3/2023 | Nudelman et al. |

FOREIGN PATENT DOCUMENTS

| | | |
|---|---|---|
| CN | 109617640 A | 4/2019 |
| WO | 03044677 A1 | 5/2003 |
| WO | 2016150833 A1 | 9/2016 |
| WO | 2016167915 A1 | 10/2016 |

OTHER PUBLICATIONS

Mellanox Technologies, "InfiniScale IV: 36-port 40GB/s Infiniband Switch Device", pp. 1-2, year 2009.

(56) References Cited

OTHER PUBLICATIONS

Mellanox Technologies Inc., "Scaling 10Gb/s Clustering at Wire-Speed", pp. 1-8, year 2006.
IEEE 802.1D Standard "IEEE Standard for Local and Metropolitan Area Networks—Media Access Control (MAC) Bridges", IEEE Computer Society, pp. 1-281, Jun. 9, 2004.
IEEE 802.1AX Standard "IEEE Standard for Local and Metropolitan Area Networks—Link Aggregation", IEEE Computer Society, pp. 1-163, Nov. 3, 2008.
Turner et al., "Multirate Clos Networks", IEEE Communications Magazine, pp. 1-11, Oct. 2003.
Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.
"MPI: A Message-Passing Interface Standard," Message Passing Interface Forum, version 3.1, pp. 1-868, Jun. 4, 2015.
Coti et al., "MPI Applications on Grids: a Topology Aware Approach," Proceedings of the 15th International European Conference on Parallel and Distributed Computing (EuroPar'09), pp. 1-12, Aug. 2009.
Petrini et al., "The Quadrics Network (QsNet): High-Performance Clustering Technology," Proceedings of the 9th IEEE Symposium on Hot Interconnects (HotI'01), pp. 1-6, Aug. 2001.
Sancho et al., "Efficient Offloading of Collective Communications in Large-Scale Systems," Proceedings of the 2007 IEEE International Conference on Cluster Computing, pp. 1-10, Sep. 17-20, 2007.
Priest et al., "You've Got Mail (YGM): Building Missing Asynchronous Communication Primitives", IEEE International Parallel and Distributed Processing Symposium Workshops, pp. 221-230, year 2019.
InfiniBand Architecture Specification, vol. 1, Release 1.2.1, pp. 1-1727, Nov. 2007.
Deming, "Infiniband Architectural Overview", Storage Developer Conference, pp. 1-70, year 2013.
Fugger et al., "Reconciling fault-tolerant distributed computing and systems-on-chip", Distributed Computing, vol. 24, Issue 6, pp. 323-355, Jan. 2012.
Wikipedia, "System on a chip", pp. 1-4, Jul. 6, 2018.
Villavieja et al., "On-chip Distributed Shared Memory", Computer Architecture Department, pp. 1-10, Feb. 3, 2011.
Wikipedia, "Nagle's algorithm", pp. 1-4, Dec. 12, 2019.
Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.
Gainaru et al., "Using InfiniBand Hardware Gather-Scatter Capabilities to Optimize MPI All-to-All", EuroMPI '16, Edinburgh, United Kingdom, pp. 1-13, year 2016.
Pjesivac-Grbovic et al., "Performance analysis of MPI collective operations", Cluster Computing, pp. 1-25, year 2007.
Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.
Chiang et al., "Toward supporting data parallel programming on clusters of symmetric multiprocessors", Proceedings International Conference on Parallel and Distributed Systems, pp. 607-614, Dec. 14, 1998.
Danalis et al., "PTG: an abstraction for unhindered parallelism", 2014 Fourth International Workshop on Domain- Specific Languages and High-Level Frameworks for High Performance Computing, pp. 1-10, Nov. 17, 2014.
Cosnard et al., "Symbolic Scheduling of Parameterized Task Graphs on Parallel Machines," Combinatorial Optimization book series (COOP, vol. 7), pp. 217-243, year 2000.
Jeannot et al., "Automatic Multithreaded Parallel Program Generation for Message Passing Multiprocessors using paramerized Task Graphs", World Scientific, pp. 1-8, Jul. 23, 2001.
Stone, "An Efficient Parallel Algorithm for the Solution of a Tridiagonal Linear System of Equations," Journal of the Association for Computing Machinery, vol. 10, No. 1, pp. 27-38, Jan. 1973.
Kogge et al., "A Parallel Algorithm for the Efficient Solution of a General Class of Recurrence Equations," IEEE Transactions on Computers, vol. C-22, No. 8, pp. 786-793, Aug. 1973.
Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.
Wikipedia, "Loop unrolling," pp. 1-9, last edited Sep. 9, 2020 downloaded from https://en.wikipedia.org/wiki/Loop_unrolling.
Chapman et al., "Introducing OpenSHMEM: SHMEM for the PGAS Community," Proceedings of the Forth Conferene on Partitioned Global Address Space Programming Model, pp. 1-4, Oct. 2010.
CN Application # 202110742521.4 Office Action dated Apr. 26, 2024.
Xu et al., "SLOAVx: Scalable LOgarithmic AlltoallV Algorithm for Hierarchical Multicore Systems", 13th IEEE/ACM International Symposium on Cluster, Cloud, and Grid Computing, pp. 369-376, year 2013.
NVIDIA Corporation, "NVIDIA Scalable Hierarchical Aggregation and Reduction Protocol (SHARP)," Rev. 3.0.0, pp. 1-3, year 2023.
Graham, U.S. Appl. No. 18/074,563, filed Dec. 5, 2022.
Graham, U.S. Appl. No. 18/105,846, filed Feb. 5, 2023.
Graham, U.S. Appl. No. 63/356,923, filed Jun. 29, 2022.
Oltchik et al., U.S. Appl. No. 18/451,134, filed Aug. 17, 2023.
Graham et al., U.S. Appl. No. 18/513,565, filed Nov. 19, 2023.
IEEE Standard 1588-2008, "IEEE Standard for a Precision Clock Synchronization Protocol for Networked Measurement and Control Systems", pp. 1-289, year 2008.
Weibel et al., "Implementation and Performance of Time Stamping Techniques", 2004 Conference on IEEE 1588, pp. 1-29, Sep. 28, 2004.
InfiniBandTM Architecture Specification vol. 1, Release 1.2.1,pp. 1-1727, Nov. 2007.
Lu et al., "A Fast CRC Update Implementation", Computer Engineering Laboratory, Electrical Engineering Department, pp. 113-120, Oct. 8, 2003.
Mellette et al., "Toward Optical Switching in the Data Center", IEEE 19th International Conference on High Performance Switching and Routing (HPSR), pp. 1-6, Bucharest, Romania, Jun. 18-20, 2018.
Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.
O-RAN Alliance, "O-RAN Fronthaul Working Group; Control, User and Synchronization Plane Specification", ORAN-WG4.CUS.0-v01.00, Technical Specification, pp. 1-189, year 2019.
Vattikonda et al., "Practical TDMA for Datacenter Ethernet", EuroSys conference, Bern, Switzerland, pp. 225-238, Apr. 10-13, 2012.
Ericsson AB et al., "Common Public Radio Interface: eCPRI Interface Specification", V2.0, pp. 1-109, May 10, 2019.
Xilinx Inc., "Radio over Ethernet Framer v2.1", PB056 (v2.1), pp. 1-9, Oct. 30, 2019.
Weibel, H., "High Precision Clock Synchronization according to IEEE 1588 Implementation and Performance Issues", Zurich University of Applied Sciences, pp. 1-9, Jan. 17, 2005.
Sanchez-Palencia, J., "[RFC,v3,net-next, 00/18] Time based packet transmission", pp. 1-14, Mar. 7, 2018.
IEEE Std 802.1Qaz™, "IEEE Standard for Local and metropolitan area networks-Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.
Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.
Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.

(56) References Cited

OTHER PUBLICATIONS

Wikipedia,Precision Time Protocol, pp. 1-9, Apr. 20, 2020.
SMPTE Standard, "Professional Media Over Managed IP Networks: Traffic Shaping and Delivery Timing for Video", The Society of Motion Picture and Television Engineers, pp. 1-17, Nov. 22, 2017.
Wikipedia, "Time-Sensitive Networking", pp. 1-12, Mar. 5, 2020.
Wikipedia, "Memory Protection," pp. 1-6, last edited May 23, 2021.
Mills, "Network Time Protocol (NTP)," RFC 0958, pp. 2-15, Sep. 1985.
Mills, "Network Time Protocol (Version 1): Specification and Implementation," RFC 1059, pp. 2-59, Jul. 1988.
Mills, "Internet Time Synchronization: The Network Time Protocol," IEEE Transactions on Communication, vol. 39, No. 10, pp. 1482-1493, Oct. 1991.
Mills, "Network Time Protocol (Version 3): Specification, Implementation and Analysis," RFC 1305, pp. 1-96, Mar. 1992.
Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.
Pacheco, "A User's Guide to MPI," Department of Mathematics, University of San Francisco, CA, USA, pp. 1-51, Mar. 30, 1998.
Wikipedia, "Message Passing Interface," pp. 1-16, last edited Nov. 7, 2021, as downloaded from https://en.wikipedia.org/wiki/Message_Passing_Interface.
"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.

\* cited by examiner

505

PERFORMING THE FOLLOWING IN TIMING CIRCUITRY, THE TIMING CIRCUITRY COMPRISING: AN ARMING QUEUE; A CLOCK WORK QUEUE; AND A CLOCK COMPLETION QUEUE:

510

THE CLOCK WORK QUEUE PROVIDING TIMING INFORMATION

520

THE ARMING QUEUE ARMING THE CLOCK WORK QUEUE

THE CLOCK WORK QUEUE SYNCHRONIZES A SENDING TIME OF PACKETS POINTED TO BY ENTRIES IN A SEND QUEUE CONFIGURED TO HOLD ENTRIES POINTING TO PACKETS TO BE TRANSMITTED, VIA INTERACTION WITH THE CLOCK COMPLETION QUEUE

IN PACKET SENDING CIRCUITRY, TRANSMITTING ONE OR MORE PACKETS OVER A NETWORK, THE PACKET SENDING CIRCUITRY TRANSMITTING THE ONE OR MORE PACKETS IN ACCORDANCE WITH THE SENDING TIME OF CORRESPONDING ENTRIES IN THE SEND QUEUE.

FIG. 7

CLOCK QUEUE WITH ARMING AND/OR SELF-ARMING FEATURES

RELATED APPLICATION INFORMATION

The present application is a continuation of U.S. patent application Ser. No. 17/335,122, filed 1 Jun. 2021, which claims priority from U.S. Provisional Patent Application Ser. No. 63/047,275 of Ariel Shahar et al, filed 2 Jul. 2020, the disclosure of which is hereby incorporated herein by reference.

FIELD OF THE INVENTION

The present invention relates in general to systems and methods for accurate scheduling, including, but not limited to, accurate scheduling of packet transmission and related technologies, and specifically but not exclusively to such systems and methods in the context of a clock queue.

BACKGROUND OF THE INVENTION

Various systems and methods intended to allow accurate scheduling of packet transmission are known. Some examples are described in the following pending US patent application: U.S. patent application Ser. No. 16/430,457 of Levi et al, published as US Published Patent Application 2019/0379714, the disclosure of which is hereby incorporated herein by reference.

The concept of memory protection, which is described, for example, in en.wikipedia.org/wiki/Memory_protection, may be useful in understanding certain embodiments of the present invention.

SUMMARY OF THE INVENTION

The present invention, in certain exemplary embodiments thereof, seeks to provide improved systems and methods for accurate scheduling of packet transmission and related technologies.

In certain exemplary embodiments, the present invention may be useful in the following scenario:

Communication Networks such as Enhanced Common Public Radio Interface (eCPRI), Optical Data center Network (ODCN), video over IP (e.g., Society of Motion Picture and Television Engineers (SMPTE) 2110) and others, use Time Division Multiplex (TDM) or, sometimes, Time-Division-Multiple Access (TDMA) for communicating between endpoints, wherein a plurality of data sources share the same physical medium during different time intervals, which are referred to as timeslots.

eCPRI is described, for example, in eCPRI Specification V2.0 (2019 May 10), by Ericsson A B, Huawei Technologies Co. Ltd, NEC Corporation and Nokia. One relevant implementation of eCPRI is described in the O-RAN specification. Optical datacenter networks are described, for example, in "NEPHELE: an end-to-end scalable and dynamically reconfigurable optical architecture for application-aware SDN cloud datacenters," IEEE Communications Magazine (Volume: 56, Issue: 2, February 2018. DOI: 10.1109/MCOM.2018.1600804), by Paraskevas Bakopoulos et al.

TDMA multiplexing in high performance networks requires good synchronization between the end points, which is usually achieved by high precision time bases.

Specialized circuitry, such as that described by Xilinx RoE Framer IP documentation (Xilinx PB056 (v2.1) Oct. 30, 2019) may also be used to send and receive data in TDM network; however, such specialized circuitry may be expensive and inflexible.

Certain exemplary embodiments of the present invention seek to provide network-time dependent network communications using network elements, including inexpensive network adapters such as Network Interface Controllers (NICs) in the context of Ethernet™, or Host Channel Adapters (HCAs) in the context of InfiniBand. While the description below focuses mainly on embodiments suitable for network adapters, the disclosed techniques are not limited to network adapters, and may be used with any suitable network elements, including, for example, switches and routers.

It is appreciated that, in certain exemplary embodiments, the present invention may also be used in scenarios involving one or more of the following: TDM Networking; optical switching; and time sensitive networking.

There is thus provided in accordance with an exemplary embodiment of the present a timing system including timing circuitry including an arming queue, a clock work queue, and a clock completion queue, wherein at least the clock work queue is to provide timing information, and the arming queue is to arm the clock work queue.

Further in accordance with an exemplary embodiment of the present invention the clock completion queue is also to provide timing information.

Still further in accordance with an exemplary embodiment of the present invention the clock work queue is for synchronizing a sending time of packets pointed to by entries in a send queue to hold entries pointing to packets to be transmitted, via interaction with the clock completion queue.

Additionally in accordance with an exemplary embodiment of the present invention the send queue is associated with an application running in a host external to the timing system.

Moreover in accordance with an exemplary embodiment of the present invention the send queue includes a plurality of send queues, each of which is associated with an application running in a host external to the timing system.

Further in accordance with an exemplary embodiment of the present invention at least one of the clock work queue and the clock completion queue is implemented in firmware.

Still further in accordance with an exemplary embodiment of the present invention the send queue includes a plurality of send queues each of which is associated with an application running in a host external to the timing system, and a least one application is associated with a different protection domain than at least one other application.

Additionally in accordance with an exemplary embodiment of the present invention the timing system also includes packet sending circuitry to transmit one or more packets over a network, wherein the packet sending circuitry is further to transmit the one or more packets in accordance with the sending time of corresponding entries in the send queue.

Moreover in accordance with an exemplary embodiment of the present invention the timing circuitry is included in a network interface card (NIC).

Further in accordance with an exemplary embodiment of the present invention the packet sending circuitry and the timing circuitry are included in a network interface card (NIC).

Still further in accordance with an exemplary embodiment of the present invention the arming queue includes at least a first arming queue and a second arming queue, and the first arming queue is to arm the second arming queue, and the second arming queue is to arm the first arming queue.

There is also provided in accordance with another exemplary embodiment of the present invention a method for packet transmission including performing the following in timing circuitry, the timing circuitry including an arming queue, a clock work queue, and a clock completion queue: the clock work queue providing timing information, and the arming queue arming the clock work queue.

Further in accordance with an exemplary embodiment of the present invention the clock work queue synchronizes a sending time of packets pointed to by entries in a send queue to hold entries pointing to packets to be transmitted, via interaction with the clock completion queue.

Still further in accordance with an exemplary embodiment of the present invention the send queue is associated with an application running in a host external to the timing circuitry.

Additionally in accordance with an exemplary embodiment of the present invention the send queue includes a plurality of send queues each of which is associated with an application running in a host external to the timing circuitry.

Moreover in accordance with an exemplary embodiment of the present invention the method also includes, in packet sending circuitry, transmitting one or more packets over a network, wherein the packet sending circuitry transmits the one or more packets in accordance with the sending time of corresponding entries in the send queue.

Further in accordance with an exemplary embodiment of the present invention the arming queue includes at least a first arming queue and a second arming queue, and the method also includes the first arming queue arming the second arming queue, and the second arming queue arming the first arming queue.

Still further in accordance with an exemplary embodiment of the present invention the timing circuitry is included in a network interface card (NIC).

Additionally in accordance with an exemplary embodiment of the present invention the packet sending circuitry and the timing circuitry are included in a network interface card (NIC).

There is also provided in accordance with another exemplary embodiment of the present invention a timing system including a host system including a clock work queue and a clock completion queue, and timing circuitry in operative communication with the host system and including an arming queue, wherein at least the clock work queue is to provide timing information, and the arming queue is to arm the clock work queue.

Further in accordance with an exemplary embodiment of the present invention the clock completion queue is also to provide timing information.

Still further in accordance with an exemplary embodiment of the present invention the clock work queue is for synchronizing a sending time of packets pointed to by entries in a send queue to hold entries pointing to packets to be transmitted, via interaction with the clock completion queue.

Additionally in accordance with an exemplary embodiment of the present invention at least one of the clock work queue and the clock completion queue is implemented in firmware.

Moreover in accordance with an exemplary embodiment of the present invention the send queue includes a plurality of send queues each of which is associated with an application running in the host, and a least one application is associated with a different protection domain than at least one other application.

BRIEF DESCRIPTION OF THE DRAWINGS

The present invention will be understood and appreciated more fully from the following detailed description, taken in conjunction with the drawings in which:

FIGS. 5-7 are simplified flowchart illustrations of exemplary modes of operation of exemplary embodiments of the present invention.

DETAILED DESCRIPTION OF AN EMBODIMENT

Figure 1A:
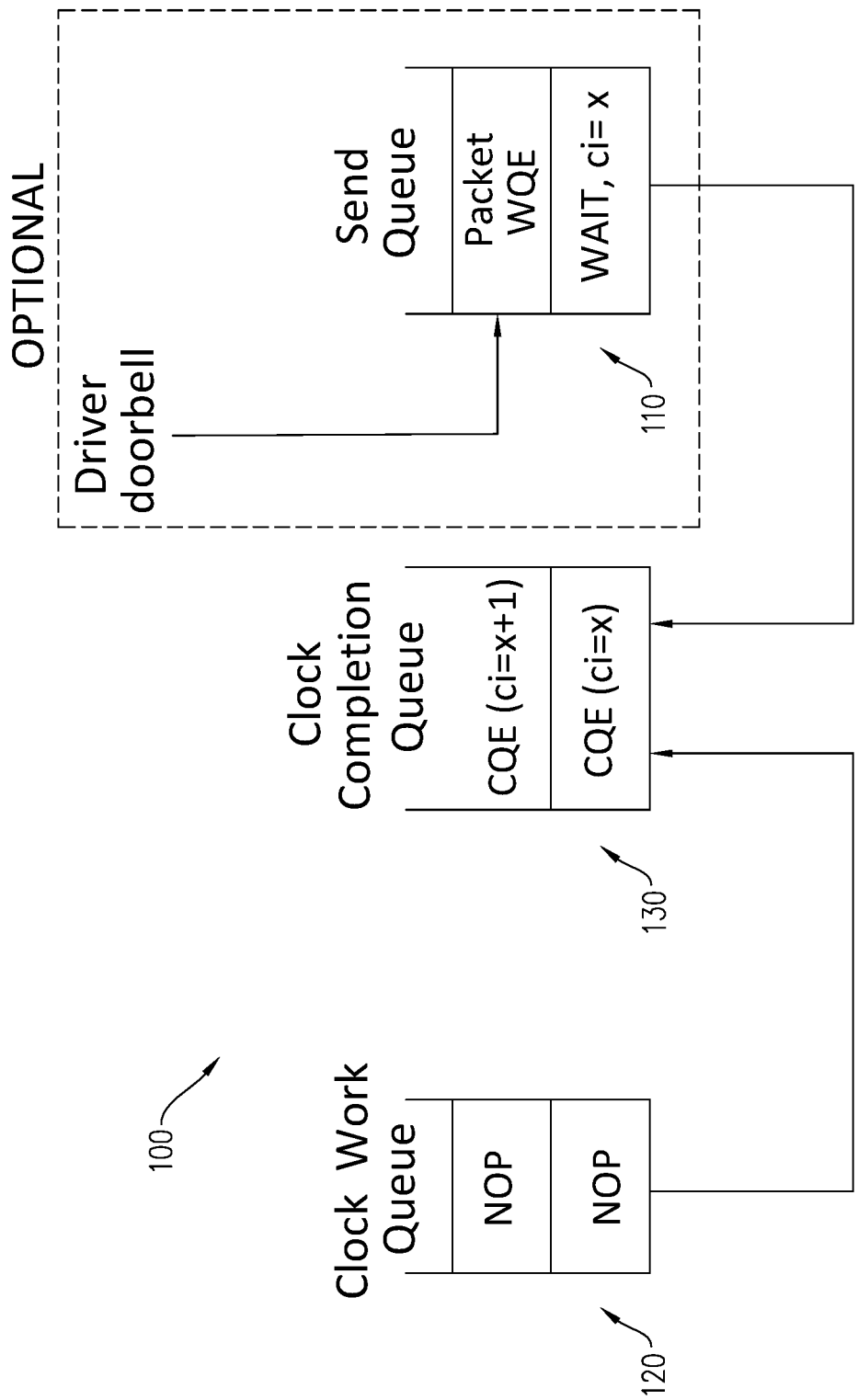
FIG. 1A is a simplified block diagram illustration of a clock queue-based system, constructed and operative in accordance with an exemplary embodiment of the present invention.

As described in U.S. patent application Ser. No. 16/430, 457 of Levi et al, published as US Published Patent Application 2019/0379714, the disclosure of which has been incorporated herein by reference:

A "send enable" work request (which may comprise a work queue element (WQE), as is known in Infini-Band) is posted to a so-called "master" send queue. The posted WQE has a form/contents which indicated that a WQE from a "different" queue (not from the master send queue) should be executed and sent. In the meantime, in the "different" queue, a slave send queue, WQEs are posted indicating that data should be sent. However, continuing with the present example, in the slave queue no doorbell is executed, so the WQEs in the slave queue are not executed and sent at the time that the WQEs are posted; such doorbell/s are generally sent to a network interface controller (NIC) which has access to the queues and to memory pointed to by WQEs. In the meantime a hardware packing mechanism causes doorbells to be generated by the NIC (generally every short and deterministic period of time, such as for example every few nanoseconds); these doorbells are executed in the master queue, causing NOP WQEs (each of which produces a delay as specified above) to be executed; finally, when the "send enable" work request in the master send queue is executed, this causes a doorbell to be issued to the slave queue, and the WQEs therein are then executed, causing data (packets) indicated by the slave queue WQEs to be sent. Thus, the master queue synchronizes send of data based on the WQEs in the slave queue.

The solution described immediately above may create many queues, because there is master queue per slave queue, and hence one master queue per stream of packets to be sent. An alternative solution may be implemented as follows, with all streams for a given bit rate being synchronized to a master queue for that bit rate:

For every specific synchronization interval (that is, for every given time desired between doorbells in a slave queue, the doorbells causing, as described above, data packets to be sent) a reference queue ("master" queue) is established, containing a constant number of NOP work requests followed by a send enable work request. In the particular non-limiting example in which a NOP work request has the same transmission time as 8 bits and therefore represents 8 bits of delay (with the same being true for a send enable work request), then:

$$\frac{((\text{number of } NOP \text{ plus Send Enable work requests}) * 8 \text{ bits})}{\text{bitrate}}$$

should be exactly equal to the synchronization interval (to an accuracy of the transmission time of 8 bits). If higher accuracy is needed, the bitrate for the "master" queue and the number of NOP work requests could be increased in order to increase accuracy.

After the NOP work requests as described above have been posted, the send enable work request as described above is posted. The send enable work request sends a doorbell to each slave queue, such that each slave queue will send data packets in accordance with the WQEs therein.

Dedicated software (which could alternatively be implemented in firmware, hardware, etc.) indefinitely continues to repost NOP and send enable work requests to the "master" queue, so that the process continues with subsequent synchronization intervals; it being appreciated that if no more data packets are to be sent, the dedicated software may cease to post NOP and send enable work requests in the "master" queue (which ceasing may be based on user intervention).

From the above description it will be appreciated that the software overhead in this alternative solution is per synchronization period, not per transmitted queue, nor per bitrate.

With reference to the above-described embodiments, alternatively the doorbell sent to the slave queue or queues may be sent when a completion queue entry (CQE) is posted to a completion queue, after processing of a send enable WQE.

Reference is now made to FIG. 1A, which is a simplified block diagram illustration of a clock queue-based system, constructed and operative in accordance with an exemplary embodiment of the present invention. The system of FIG. 1A is generally, but not necessarily, comprised in a network interface card (NIC), it being appreciated that other suitable embodiments (which, in light of the present description, will be evident to persons skilled in the art) are also possible. In the system of FIG. 1A, similarly to what is described immediately above with reference to U.S. patent application Ser. No. 16/430,457 of Levi et al, a system generally designated 100 is illustrated.

The system 100 includes a clock work queue 120, which is a work queue that has been posted with dummy commands (NOP descriptors); these NOP descriptors are used for packet rate enforcement. In some exemplary embodiments, the commands posted to the clock work queue may not necessarily be NOP commands; other commands may also lead to the desired packet rate enforcement behavior. For simplicity of depiction and description and without limiting the generality of the foregoing, NOP commands are generally described herein.

In general, the system 100 will trigger every "clock-tick" time. If, by way of non-limiting example, the clock-tick is 500 nanoseconds, the system 100 will execute 2 million commands per second in the clock work queue 120, in order to maintain the desired pace.

It will be appreciated that it will be necessary to re-post the NOP commands to the clock work queue 120 (typically by software; although alternatively, by way of non-limiting example, by firmware) every Queue-size/2 time, in order for the system 100, and in particular the clock queue 120, to run indefinitely. The NIC (or other system in which the system 100 is embedded) is configured not to check the NOP index, thereby to allow the software (for example) to write only a single NOP command into the clock work queue 120, and only update the door-bell record to send additional clock-queue-size/2 commands. The preceding is true since (in a typical case) all commands in the clock work queue 120 are the same, so that the clock work queue 120 may hold a single command with index 0, but a HW doorbell register (not shown) is armed to execute 16,000 such commands (by way of non-limiting example). In order to accomplish this, the system 100 is configured not to check the index of commands in the clock work queue 120, so that the system 100 will execute the same NOP command 16,000 times. While so operating, the system 100 will incrementing internally a "producer index" (pi, producer indexes being well known in the art) which is wrapped around at some maximum index value (such as, by way of non-limiting example, 16,000) and therefore the HW cannot be armed for more than 16,000 commands at once. In practice, actual limits (as opposed to 16,000) are generally an exact power of 2, such as, by way of non-limiting example, 16,384.

As just discussed, a typical size in entries of the clock work queue 120 would be 16K (16,384); at such a size, the software (for example) would need to arm (reload) the clock work queue 120 for every 8K commands that executed. It will be appreciated that 8K commands at a pace of 2 million commands per second represent a 4-millisecond interval. This would mean, in a software implementation, that software will have to "wake up" every 4 milliseconds to re-arm the clock work queue 120. In addition to CPU involvement in running such software, there is an important real-time restriction, since in the described scenario the software must wake up every 4 milliseconds. If the software woke up too late, the clock queue 120 will become empty (stop ticking), having a very negative impact on the reliability of the system 100.

In addition, the inventors of the present invention believe that real-time requirements on software are extremely problematic, since such requirements are not functional requirements, and (to ensure reliability) should be tested against any contemplated actual system, in any load that the contemplated actual system is intended to run. Such a requirement is believed to be extremely problematic and challenging, and would add a significant cost to the system 100.

The system of FIG. 1A also comprises a clock completion queue 130, which contains an entry for the completion of each NOP command execution. Each such completion is generated every clock tick.

It is appreciated that one or both of the clock work queue 120 and the clock completion queue 130 may alternatively be situated in a host external to the system 100 and in operative communication therewith. It is also appreciated that each of the clock work queue 120 and the clock completion queue 130 may be implemented either in software or in firmware.

The system of FIG. 1A also optionally (optionally in certain exemplary embodiments) comprises a work queue (send queue) 110, which contains descriptors to data, which needs to be accurately transmitted "to the wire" (to exit the system, such as a NIC, in which the system 100 of FIG. 1A is comprised, for network transmission) at a specific network time. The work queue 110 may, in certain exemplary embodiments, serve a particular application running on a host with which the system 100 is in operative communication.

It is appreciated that, while not shown in any of FIGS. 1A-4B, the systems of FIGS. 1A-4B each generally (but optionally) comprise a packet sending module or circuitry, as is known in the art, for sending packets "to the wire". More precisely, the specific time as described may be considered to be "do not transmit before a specific time". The "fencing" (accurate scheduling) of transmission is done by a special command that fences the execution until a specific index of a completion message is generated.

The inventors of the present invention believe that the system described in U.S. patent application Ser. No. 16/430,457 of Levi et al, which has been incorporated herein by reference (and similarly the system of FIG. 1A described immediately above) has certain drawbacks which are intended to be overcome in certain exemplary embodiments of the present invention. In particular (referring to FIG. 1A by way of non-limiting example), it would be necessary to repost packets to the clock queue 120 and to arm the doorbell record. (It is noted that the "doorbell record" referred to here is well known in the art, and is not shown in the drawings; it is a static entity implemented for example as a set of registers for each queue holding for that queue a consumer index ci and a producer index pi. The consumer index indicates how many jobs (tasks) have been completed, while the pi indicates how many jobs have been published for execution. When ci=pi there is no more work to do at the present time).

Generally speaking, such operations would take place under software control and would consume significant resources. Moreover, such operations would need to be "real time" in software terms, so that each queue of a given pace would need to be armed in accordance with a different real time pace. In a realistic scenario, a system would handle (by way of non-limiting example) 2 million packets per second. The inventors of the present invention further believe that, in a software-implemented system, changes (such as changes in clock rate/pace or addition of a clock at a new rate/pace) would cause a need to retest software due to the new burdens placed on the software. The present invention, in exemplary embodiments thereof, is intended to overcome such limitations, particularly, but not exclusively, by being designed to minimize or even eliminate software resources in reposting and arming as described above (in particular, with respect to the above discussion of real-time requirements in software).

Figure 1B:
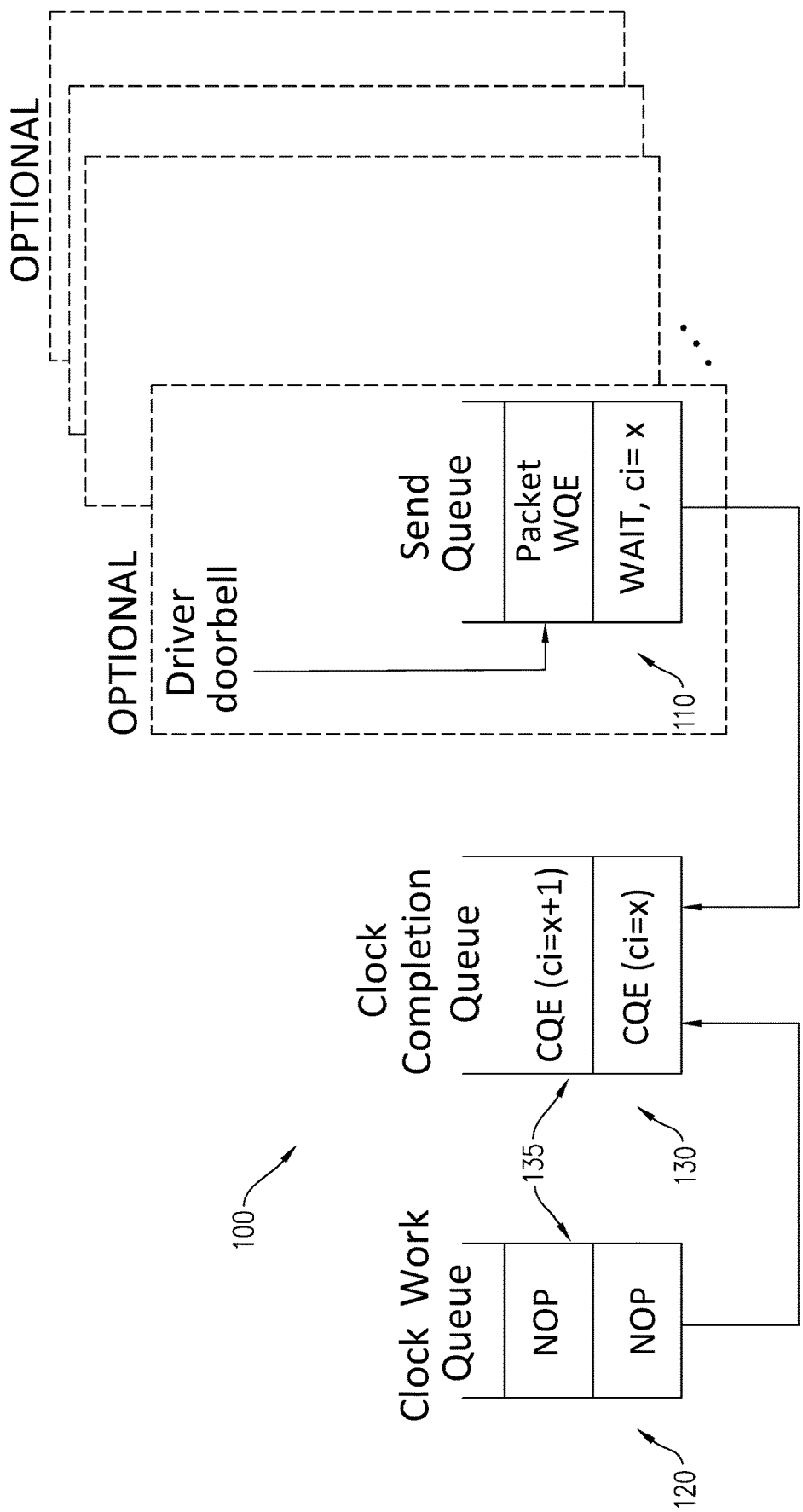
FIG. 1B is a simplified block diagram illustration of a clock queue-based system, comprising an alternative exemplary embodiment of the system of FIG. 1A.

Reference is now additionally made to FIG. 1B, which is a simplified block diagram illustration of a clock queue based system, comprising an alternative exemplary embodiment of the system of FIG. 1A. The system of FIG. 1B is similar to the system of FIG. 1A, except that for a subsystem 135 (comprising the clock work queue 120 and the clock completion queue 130) there may be a plurality of work queues 110 each of which, in certain exemplary embodiments, may serve a particular application running on a host with which the system 100 is in operative communication, such that a plurality of applications may be served by the subsystem 135.

The concept of memory protection (which is described, for example, in en.wikipedia.org/wiki/Memory_protection) may be useful in understanding the exemplary embodiment of FIG. 1B, as well as certain other exemplary embodiments of the present invention. In general, any given application will be associated with a particular protection domain; and different applications may be associated with different protection domains. In some cases, if the subsystem 135 is implemented in software, then in order to access the subsystem 135, that given application would generally need to be in the same protection domain as the subsystem 135. On the other hand, if the subsystem 135 is implemented in firmware, then the subsystem 135 will generally be in a trusted zone, and hence access between the subsystem 135 and any given application will be possible regardless of the particular protection domain with which the given application is associated. The previous explanation regarding a plurality of applications also applies, mutatis mutandis, to a plurality of virtual environments, such as virtual machines.

Figure 2A:
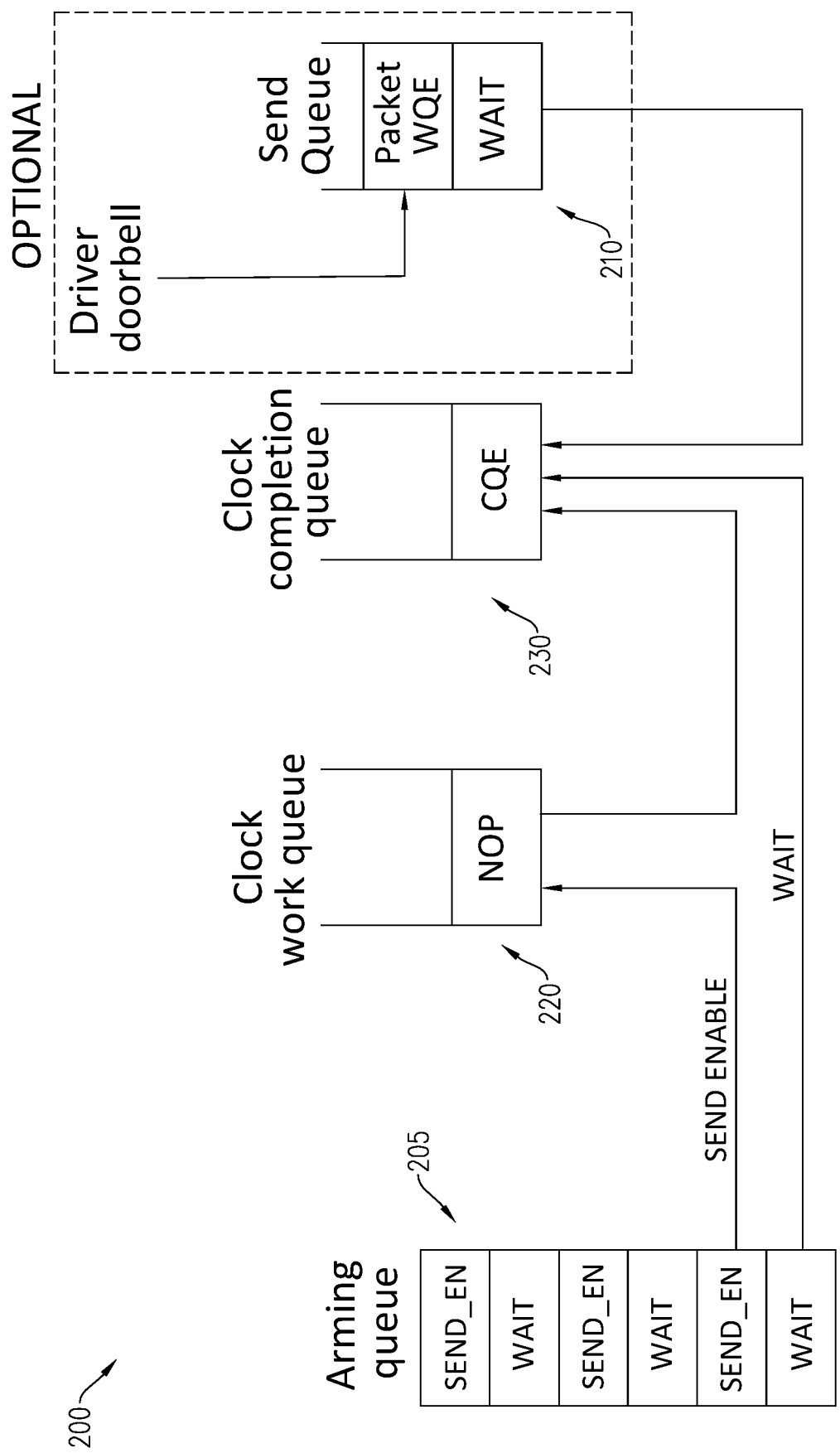
FIG. 2A is a simplified block diagram illustration of a clock queue-based system, constructed and operative in accordance with an exemplary embodiment of the present invention.

Reference is now made to FIG. 2A, which is a simplified block diagram illustration of a clock queue-based system, constructed and operative in accordance with an exemplary embodiment of the present invention.

The system of FIG. 2A, generally designated 200, is similar to the system of FIG. 1A except as described below; the system of FIG. 2A comprises a send queue 210 (which is optional in certain exemplary embodiments) similar to the send queue 110 of FIG. 1A, a clock work queue 220 similar to the clock work queue 110 of FIG. 1A, and a clock completion queue 230 similar to the clock completion queue 130 of FIG. 1A.

Additionally, the system 200 of FIG. 2A comprises an arming queue 205. The arming queue 205 is constructed and operative to arm the clock work queue 220, thus simplifying the process described above for reposting and arming.

The arming queue 205 is posted with 2 different commands one after the other, repeatedly. One such command is a "wait" command. By way of non-limiting example, the wait command may be an instruction to wait for the next index which is 8000 greater than a current index in the clock work queue 220. Typically, this would represent a 4 microsecond wait period. The other command is a "send enable" command, which is a command to trigger a further 8000 doorbell records in the clock work queue 220. The action here described replaces the action described above as taking place in software; it will appreciate that this action does not require software intervention.

As here described (by way of non-limiting example), the arming queue 205 need be triggered every 8000×4 milliseconds=32 sec; it is appreciated that such a requirement (triggering once every 32 seconds by software) represents negligible overhead. In other words, if software is required to carry out such a task only once every 32 seconds, there is no real-time requirement on the software, and the problems stated above with regard to real-time requirements on software are deemed to be overcome.

Figure 2B:
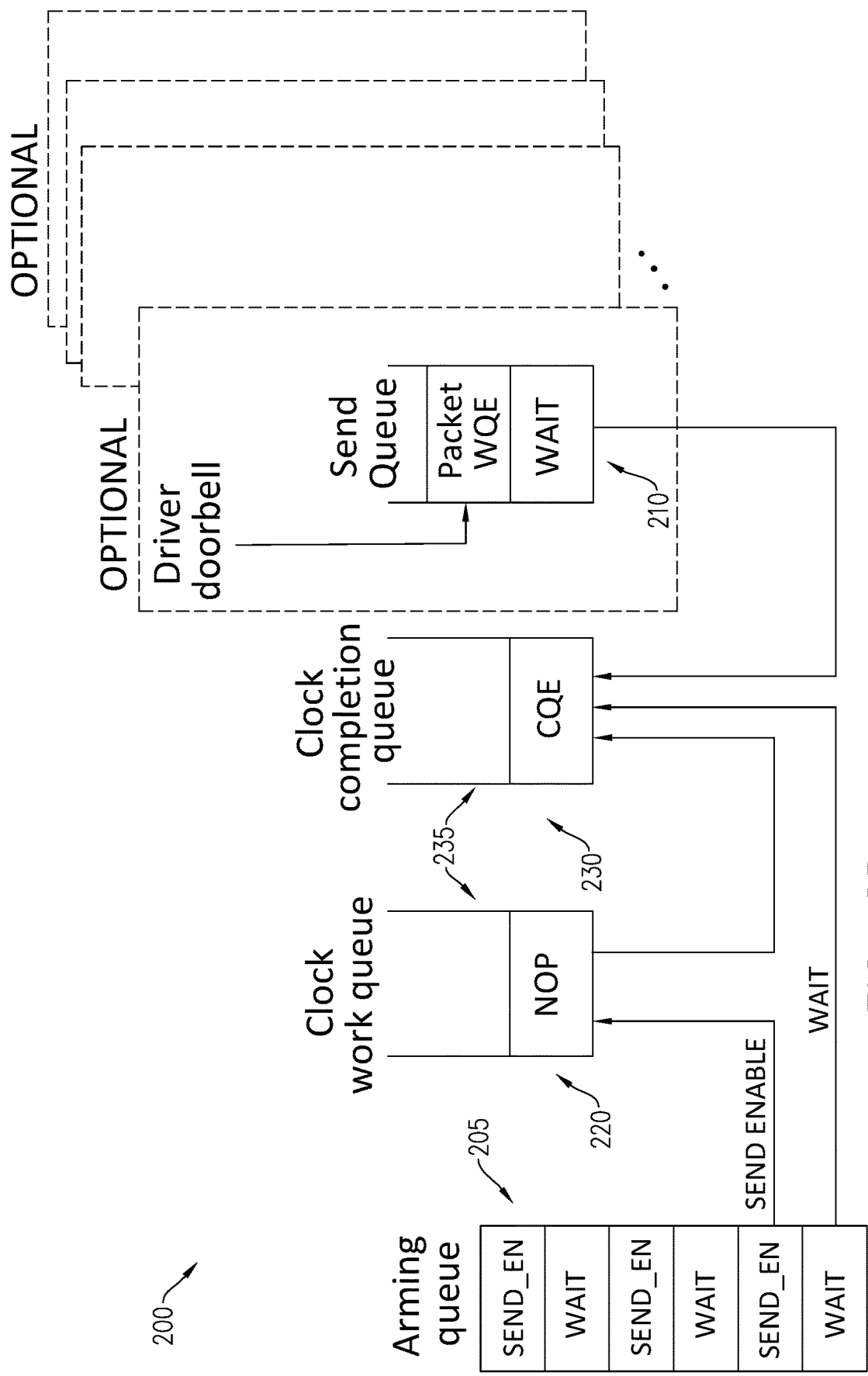
FIG. 2B is a simplified block diagram illustration of a clock queue-based system, comprising an alternative exemplary embodiment of the system of FIG. 2A.

Reference is now additionally made to FIG. 2B, which is a simplified block diagram illustration of a clock queue-based system, comprising an alternative exemplary embodiment of the system of FIG. 2A. The system of FIG. 2B is similar to the system of FIG. 2A, except that for a subsystem 235 (comprising the clock work queue 220 and the clock completion queue 230) there may be a plurality of work queues 210 each of which, in certain exemplary embodiments, may serve a particular application running on a host with which the system 200 is in operative communication, such that a plurality of applications may be served by the subsystem 235.

Figure 3A:
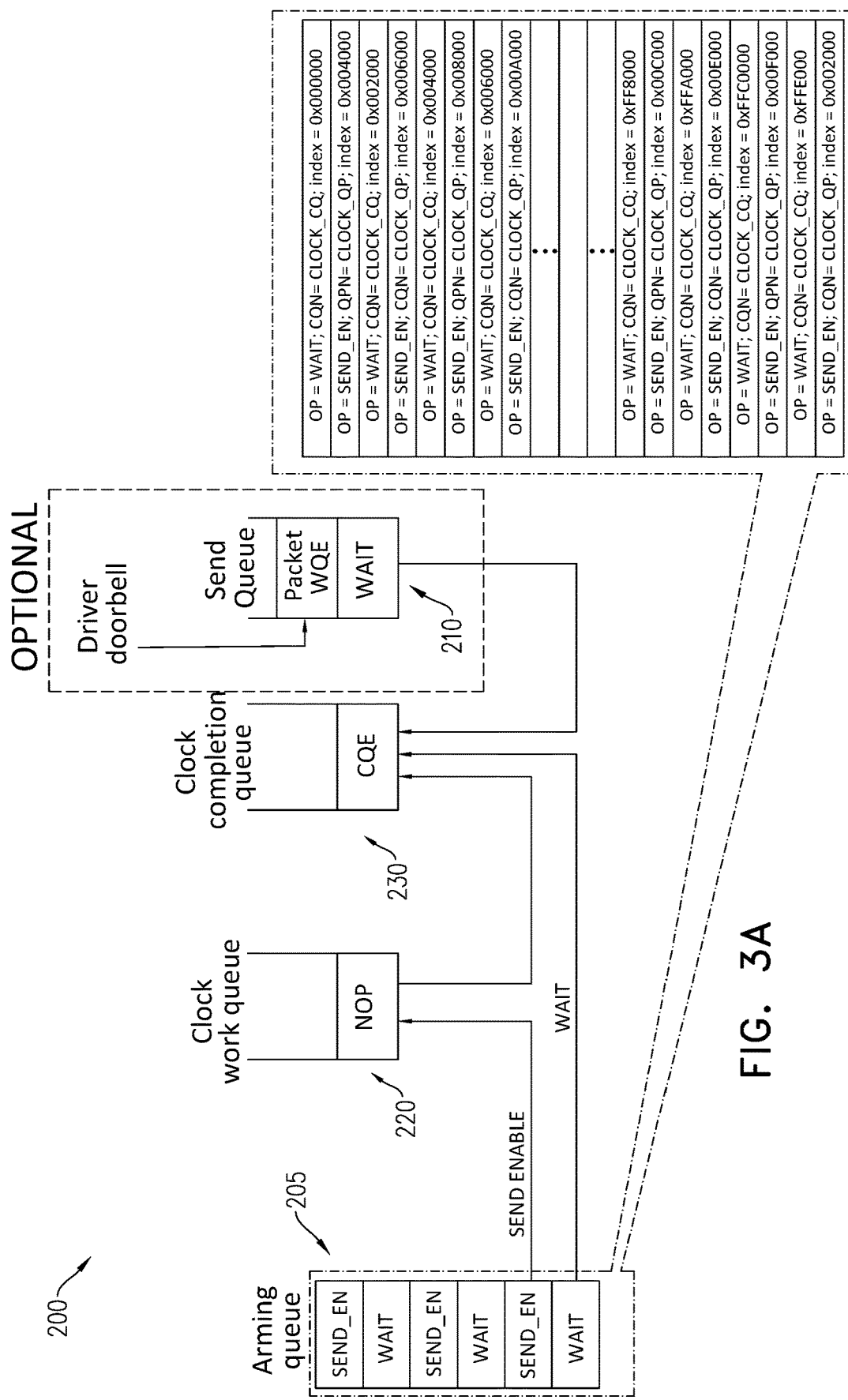
FIG. 3A is a simplified block diagram illustration of a particular example of the clock queue-based system of FIG. 2A.
Figure 3B:
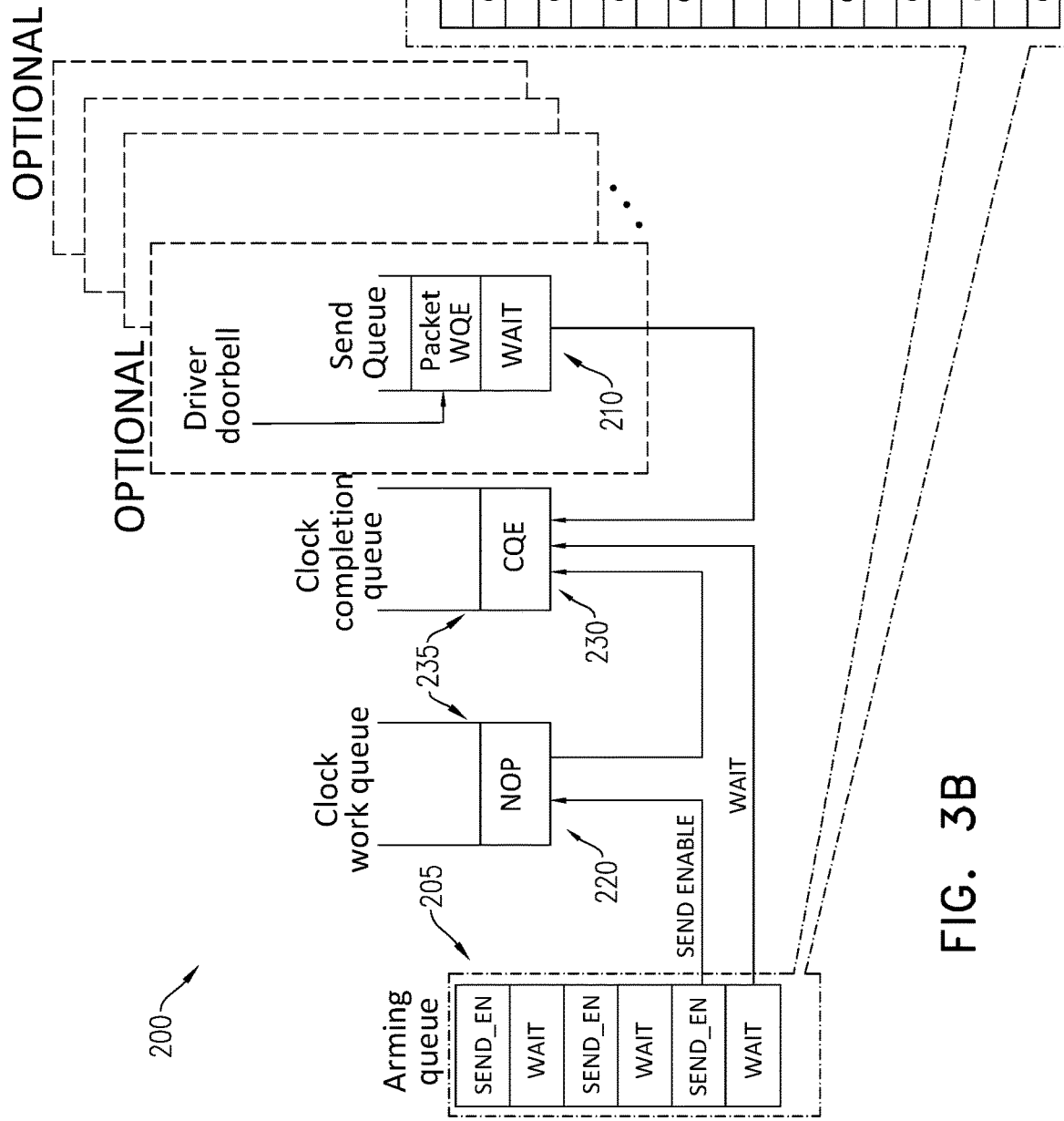
FIG. 3B is a simplified block diagram illustration of a particular example of the clock queue-based system of FIG. 2B.

Reference is now additionally made to FIG. 3A, which is a simplified block diagram illustration of a particular example of the clock queue-based system of FIG. 2A; and to FIG. 3B, which is a simplified block diagram illustration of a particular example of the clock queue-based system of FIG. 2B. The examples of FIGS. 3A and 3B shows in detail exemplary queue entries in the arming queue 305, with alternating send_enable entries (each entry indicating and index 8000 greater than the previous entry) and wait entries (each indicating a wait for a next index which is 8000 greater than the previous).

Figure 4A:
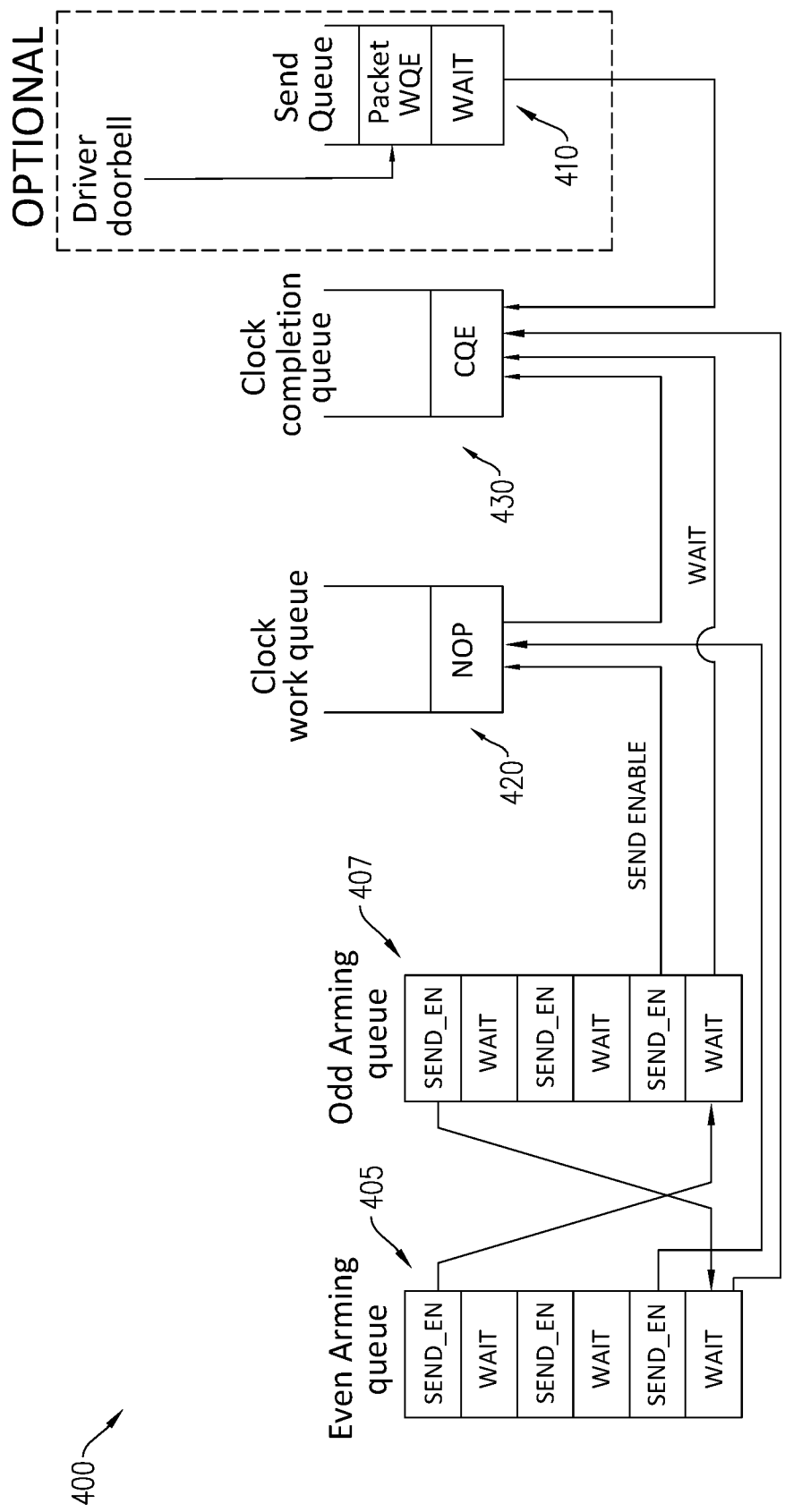
FIG. 4A is a simplified block diagram illustration of a clock queue-based system, constructed and operative in accordance with an exemplary embodiment of the present invention.

Reference is now made to FIG. 4A, which is a simplified block diagram illustration of a clock queue-based system, constructed and operative in accordance with an exemplary embodiment of the present invention.

The system of FIG. 4A, generally designated 400, is similar to the system of FIG. 2A except as described below; the system of FIG. 4A comprises a send queue 410 (which may in certain exemplary embodiments be optional) similar to the send queue 210 of FIG. 2A, a clock work queue 420 similar to the clock work queue 210 of FIG. 2A, and a clock completion queue 430 similar to the clock completion queue 330 of FIG. 2A.

In the system of FIG. 4A, compared to the system of FIG. 2A, the arming queue 205 of FIG. 2A has been replaced with an even arming queue 405 and an odd arming queue 407.

In the system 400, with two arming queues (the even arming queue 405 and the odd arming queue 407), each of the two arming queues contain waits and send_enable entries as described above with reference to FIG. 2A. In addition, at the end of each arming queue (the even arming queue 405 and the odd arming queue 407) there is an additional send_enable command which is operative to arm the "other" arming queue (the even arming queue 405 arms the odd arming queue 407 and vice versa). Thus, in the system 400 the system is "self-arming" indefinitely, so that no software operation is needed.

Persons skilled in the art will appreciate that, for simplicity of depiction and description, two arming queues (the even arming queue 405 and the odd arming queue 407) are described; in principal, three or more such queues may be used.

Figure 4B:
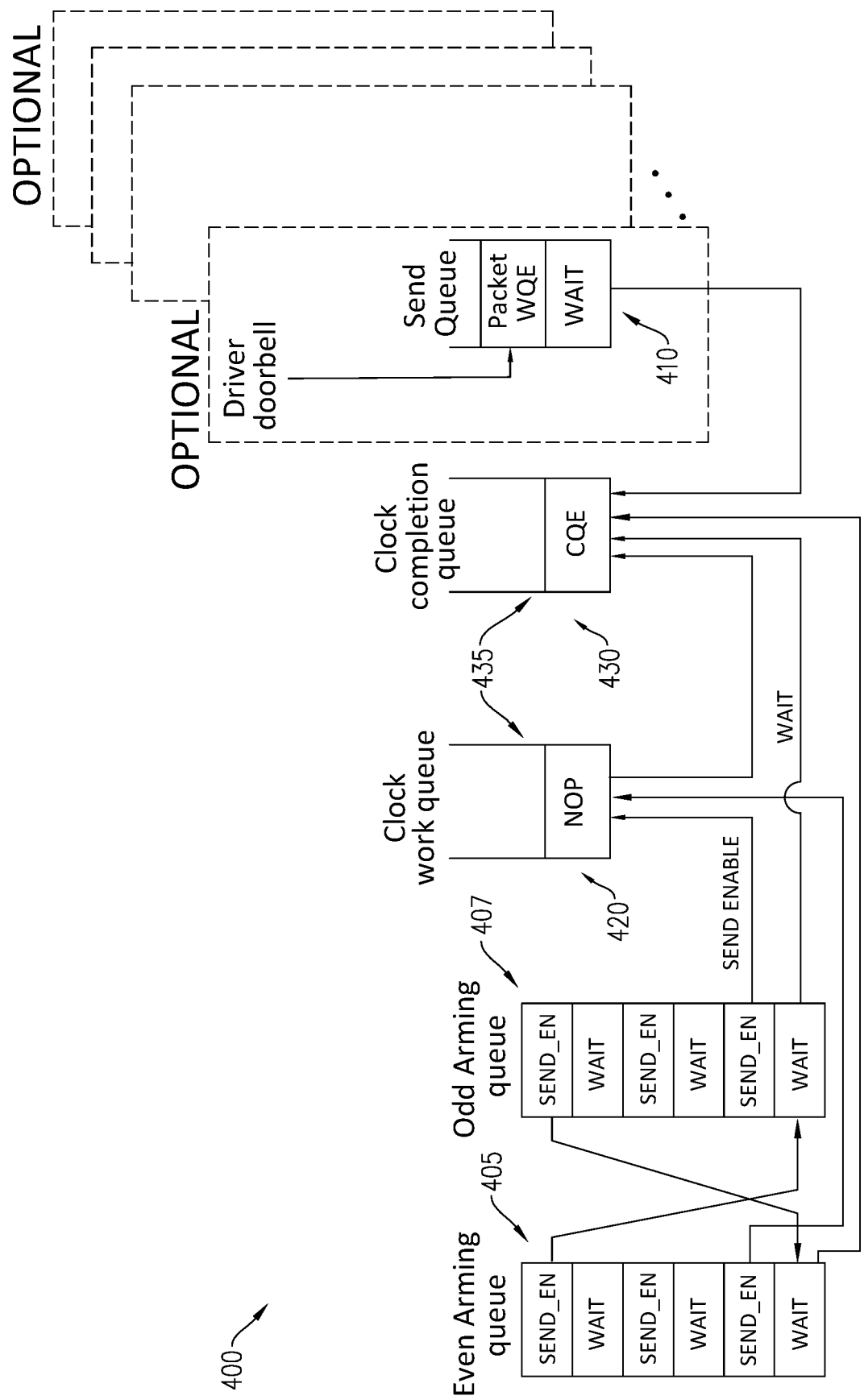
FIG. 4B is a simplified block diagram illustration of a clock queue-based system, comprising an alternative exemplary embodiment of the system of FIG. 4A.

Reference is now additionally made to FIG. 4B, which is a simplified block diagram illustration of a clock queue-based system, comprising an alternative exemplary embodiment of the system of FIG. 4A. The system of FIG. 4B is similar to the system of FIG. 4A, except that for a subsystem 435 (comprising the clock work queue 420 and the clock completion queue 430) there may be a plurality of work queues 410 each of which, in certain exemplary embodiments, may serve a particular application running on a host with which the system 400 is in operative communication, such that a plurality of applications may be served by the subsystem 435.

The various components comprised in the systems 100, 200, 300, and 400 and described above may also be termed herein, separately and/or collectively, "circuitry".

Reference is now made to FIGS. 5-7, which are simplified flowchart illustrations of exemplary modes of operation of exemplary embodiments of the present invention. FIG. 5 represents an exemplary mode of operation, with FIGS. 6 and 7 representing further steps that may be added to the method of FIG. 5.

FIGS. 5-7 will be best understood with reference to the above discussion of FIGS. 2A-4B.

The method of FIG. 5 comprises the following steps which, as indicated in step 505, are performed in timing circuitry which comprises an arming queue, a clock work queue, and a clock completion queue.

The clock work queue provides timing information (step 510), while the arming queue arms the clock work queue (step 520). In certain embodiments, the clock completion queue may also provide timing information.

In FIG. 6, the clock work queue (additionally to the steps of FIG. 5) synchronizes a sending time of packets. The packets are pointed to by entries in a send queue. The send queue, in turn, is configured to hold entries pointing to packets to be transmitted. The synchronization occurs via interaction with the clock completion queue (step 610).

In FIG. 7 (additionally to the steps of FIG. 5 plus FIG. 6), packet sending circuitry transmits one or more packets over a network. The packet sending circuitry transmits the one or more packets in accordance with the sending time of corresponding entries in the send queue (step 710).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:
1. A communication system, comprising:
at least one send queue, containing send queue entries pointing to packets to be transmitted over a network by packet sending circuitry;
a clock work queue, containing clock queue entries to synchronize sending times of the packets pointed to by the send queue entries; and
at least one arming queue containing arming queue entries to arm the clock work queue at selected time intervals.

2. The system according to claim 1, and comprising a clock completion queue, wherein the clock queue entries synchronize the sending times of the packets by generating completion queue entries in the clock completion queue.

3. The system according to claim 1, wherein the arming queue entries comprise send enable work requests, which arm the clock work queue.

4. The system according to claim 3, wherein the arming queue entries further comprise wait commands defining the selected time intervals.

5. The system according to claim 3, wherein the send enable work requests trigger a selected number of doorbell records in the clock work queue for synchronizing the sending times of the packets pointed to by the send queue entries.

6. The system according to claim 1, wherein the system comprises a network interface controller (NIC).

7. The system according to claim 6, wherein the at least one send queue is associated with at least one application running on a host external to the NIC.

8. The system according to claim 7, wherein the at least one send queue comprises a plurality of send queues, which are associated with respective applications running on the host.

9. The system according to claim 8, wherein a least one of the applications is associated with a different protection domain from at least one other of the applications.

10. The system according to claim 1, wherein the at least one arming queue comprises at least a first arming queue and a second arming queue, wherein the first arming queue is to arm the second arming queue, and the second arming queue is to arm the first arming queue.

11. A method for communication, comprising:
transmitting packets over a network by packet sending circuitry in response to reading send queue entries pointing to the packets from at least one send queue;
synchronizing sending times of the packets pointed to by the send queue entries by reading clock queue entries from a clock work queue; and
arming the clock work queue at selected time intervals in response to arming queue entries read from at least one arming queue.

12. The method according to claim 11, wherein the clock queue entries synchronize the sending times of the packets by generating completion queue entries in a clock completion queue.

13. The method according to claim 11, wherein the arming queue entries comprise send enable work requests, which arm the clock work queue.

14. The method according to claim 13, wherein the arming queue entries further comprise wait commands defining the selected time intervals.

15. The method according to claim 13, wherein the send enable work requests trigger a selected number of doorbell records in the clock work queue for synchronizing the sending times of the packets pointed to by the send queue entries.

16. The method according to claim 1, wherein the packet sending circuitry is a part of a network interface controller (NIC).

17. The method according to claim 16, wherein the at least one send queue is associated with at least one application running on a host external to the NIC.

18. The method according to claim 17, wherein the at least one send queue comprises a plurality of send queues, which are associated with respective applications running on the host.

19. The method according to claim 18, wherein a least one of the applications is associated with a different protection domain from at least one other of the applications.

20. The method according to claim 1, wherein the at least one arming queue comprises at least a first arming queue and a second arming queue, wherein the first arming queue is to arm the second arming queue, and the second arming queue is to arm the first arming queue.

* * * * *